United States Patent
Dean et al.

[19]

[11] Patent Number: 5,957,698
[45] Date of Patent: Sep. 28, 1999

[54] METHOD OF INSTRUCTION

[75] Inventors: Harvey R. Dean; Barry Dean; Kristine McKechnie; Rhonda D. Kyncl; Philip Holsinger, all of Pittsburg, Kans.

[73] Assignee: Pitsco, Inc., Pittsburg, Kans.

[21] Appl. No.: 08/741,306

[22] Filed: Oct. 30, 1996

[51] Int. Cl.⁶ ........................................... G09B 3/00
[52] U.S. Cl. .................. 434/350; 434/432; 434/431; 434/365
[58] Field of Search .................. 434/350, 432, 434/431, 365

[56] References Cited

U.S. PATENT DOCUMENTS

| | | | |
|---|---|---|---|
| 3,160,451 | 12/1964 | Lewis | 312/196 |
| 3,233,346 | 2/1966 | Cornberg | 434/307 R |
| 3,366,415 | 1/1968 | Cooper . | |
| 3,401,469 | 9/1968 | Shaver et al. | 434/307 R |
| 3,418,765 | 12/1968 | Propst et al. | 52/36.1 |
| 3,688,419 | 9/1972 | Woolman | 434/432 |
| 3,698,104 | 10/1972 | Sutton | 434/432 |
| 3,778,911 | 12/1973 | Woolman | 434/432 |
| 3,818,609 | 6/1974 | Woolman | 434/237 |
| 3,869,992 | 3/1975 | Kramer | 108/60 |
| 4,715,818 | 12/1987 | Shapiro et al. | 434/118 |
| 5,002,491 | 3/1991 | Abrahamson et al. | 434/322 |
| 5,008,853 | 4/1991 | Bly et al. | 364/900 |
| 5,176,520 | 1/1993 | Hamilton | 434/350 |
| 5,237,604 | 8/1993 | Ryan | 379/220 |
| 5,263,869 | 11/1993 | Ziv-El | 434/336 |
| 5,267,865 | 12/1993 | Lee et al. | 434/350 |
| 5,310,349 | 5/1994 | Daniels et al. | 434/350 |
| 5,318,450 | 6/1994 | Carver | 434/336 |
| 5,437,555 | 8/1995 | Ziv-El | 434/336 |
| 5,441,415 | 8/1995 | Lee et al. | 434/350 |
| 5,567,164 | 10/1996 | Durkin et al. | 434/432 |

*Primary Examiner*—Jessica J. Harrison
*Assistant Examiner*—David A. Fleming
*Attorney, Agent, or Firm*—Hovey, Williams, Timmons & Collins

[57] ABSTRACT

A computer-assisted instruction system used in a method of instructing a group of students broadly includes a suite (12,14,16,18) configured to accommodate the group of students and a computer system (36) for delivery of instruction relating to an instruction curriculum to the suite (12, 14,16,18). The suite (12,14,16,18) includes a group assembly area and a plurality of harbors (24). The harbors (24) are each configured to accommodate a pair of the students. The computer system (36) includes a computer (38) positioned at each harbor coupled with a network computer (40). The computers (38) are linked to permit electronic transfer of information between the harbors (24). A method of instruction broadly includes the steps of assigning a pair of the group of students to each of the harbors (24), presenting a portion of an instruction curriculum to the pair of students at each harbor (24), assembling the students within the suite (12,14,16,18) after a selected period of time, presenting a group project to the assembled group of students, and dividing the group project into project segments, the pairs of students leaving the group assembly area to work on the project segments at their respective harbors (24). A presentation of the group project is given after the students reassemble.

29 Claims, 1 Drawing Sheet

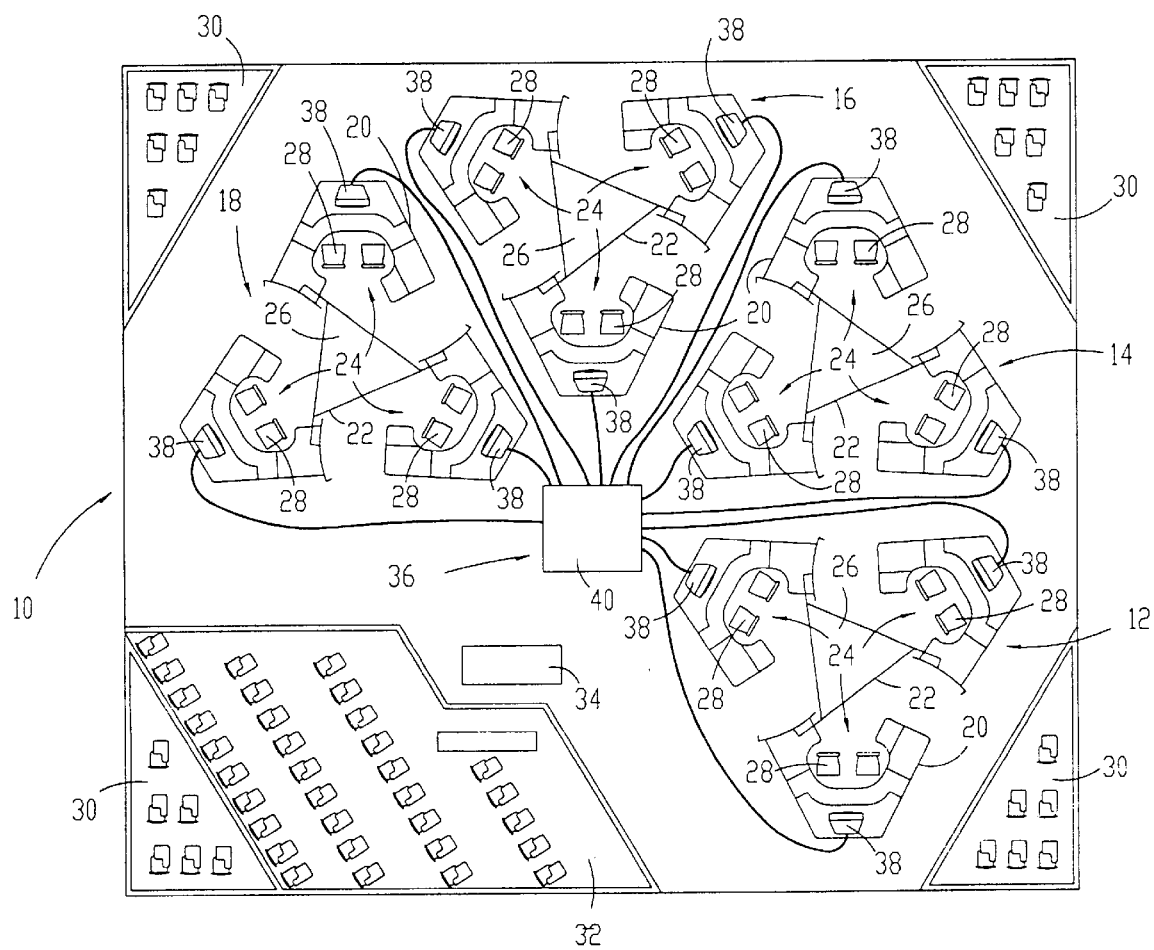

METHOD OF INSTRUCTION

BACKGROUND OF THE INVENTION

1. Field of the Invention

The present invention relates generally to a method of instructing a group of students. More particularly, the method involves engaging three pairs of a group of students in the same self-directed, computer-assisted course of study, and assembling the pairs of students together into a group for preparation of a group project, the group again separating into pairs of students to work on segments of the group project. A presentation of the group project is given after the students reassemble.

2. Description of the Prior Art

Several competencies have been suggested by the U.S. Department of Labor in its SCANS (Secretary's Commission on Achieving Necessary Skills) Report for America 2000, published in June, 1991, for addition to school curriculums. The competencies include resources (allocates time, money, materials, space and human resources), interpersonal skills (participates as a member of a team, teaching others new skills, serves clients and customers, exercises leadership, negotiates and works with diversity), information (acquires and evaluates information, organizes and maintains information, interprets and communicates information, and uses computers to process information), systems (understands systems, monitors and corrects performance, and improves or designs systems) and technology (selects technology, applies technology to tasks, and maintains and troubleshoots equipment).

In addition, the SCANS Report suggested the addition to school curriculums of a three-part foundation of skills and personal qualities. The three-part foundation includes basic skills, such as reading, writing, arithmetic and mathematics, speaking and listening, thinking skills, such as creative thinking, decision making, problem solving, seeing things in the mind's eye, knowing how to learn and reasoning, and personal qualities, such as responsibility, self-esteem, sociability, self-management and integrity and honesty.

Prior art educational devices do not provide a suitable means for incorporating the competencies, skills and personal qualities as recommended by the SCANS Report. In addition, prior art methods of educating are not suitable for incorporating these recommendations. Accordingly, there is a need for an improved method of instruction incorporating the recommendations of the SCANS Report, and a system used in implementing the method.

SUMMARY OF THE INVENTION

The present invention addresses the prior art problems discussed above and is directed toward an improved technology-assisted method of instructing a group of students incorporating many of the competencies and foundations recommended by the SCANS Report. The invention is also directed toward a technology-assisted instruction system used in implementing the method hereof.

In broad terms, the method utilizes a suite configured to accommodate a group of students. The suite includes a group assembly area and a plurality of harbors. The harbors are each configured to accommodate a pair of the group of students. The method involves the steps of assigning a pair of the group of students to each of the harbors, presenting a portion of an instructional curriculum to the pair of students at each harbor, assembling the students within the suite after a selected period of time, presenting a group project to the assembled group of students. The pairs of students then leave the group assembly area to each work on a segment of the project at their respective harbors. A presentation of the group project is given after the students reassemble.

The technology-assisted instruction system broadly includes a suite configured to accommodate the group of students and an instruction delivery means for delivery of instruction relating to an instructional curriculum to the suite. The suite includes a group assembly area and a plurality of harbors. The harbors are each configured to accommodate a pair of the students. The instruction delivery means includes a display or monitor positioned at each harbor coupled with a computer. The computers are networked to permit electronic transfer of information between the harbors for exchange of information between the students, and to permit the facilitator to manage the participants including assessment of the participants.

DESCRIPTION OF THE DRAWING FIGURE

The single drawing FIGURE is a schematic view of a classroom including a technology-assisted instruction system for implementing the present invention.

DETAILED DESCRIPTION OF THE PREFERRED EMBODIMENT

A method of instruction is described below with reference to the single drawing FIGURE. The method is preferably used in a specialized classroom 10 configured to accommodate a pool of students. Classroom 10 preferably provides an area of about 2600 square feet. In addition, the students are preferably in the 9th or 10th grades. Of course, the method may be used with students of various other grades or ages, such as high school, college or adult-aged students, and in classrooms of varying sizes, such as in large corporate settings and small, private school settings.

The inventive method is designed to teach group dynamics, team work, collegiality, problem-solving and business acumen to the pool of students through a course of study. This course of study places the learning responsibility into the hands of a group of students working toward a common goal. The course of study includes hands-on activities built around real world challenges. The class instructor becomes a facilitator who guides and advises students. The course of study is marketed under the trademark "PATHWAYS".

Preferred classroom 10 includes four suites, 12, 14, 16, 18. Each suite 12, 14, 16, 18 is configured to teach a relatively different instructional curriculum to group of the pool of students, each group being assigned to one of suites 12, 14, 16, 18. The curriculums cooperably define the course of study. As a result, each group is subjected to a different instructional curriculum within the course of study.

Each of suites 12, 14, 16, 18 includes outer periphery 20, group table 22 positioned in a centrally located group assembly area and three harbors 24 positioned between table 22 and periphery 20. Group table 22 includes upper surface 26 constructed from markerboard material. Harbors 24 each include a pair of seats 28 so that harbors 24 are each configured to accommodate a pair of the group of students assigned to suite 12, 14, 16, 18. As a result, six students are assigned to each suite 12, 14, 16, 18. A minimum of three students may also be used when necessary.

To ensure that each group comprises six students, and a minimum of three students, a plurality of student overflow seating areas 30 are positioned about classroom 10. When the pool of students is greater than 24 students (comprising four groups of six students), overflow areas 30 may be used to accommodate the number of students in excess of 24. In addition, when the pool of students is less than 24 students, overflow areas 30 may be used to accommodate the number of students who do not comprise a complete group.

Classroom seating area 32 is provided in classroom 10 remote from suites 12, 14, 16, 18. Classroom seating area 32 is configured to accommodate the pool of students for orientation purposes at the beginning of the course of study. Classroom seating area 32 is also used by the groups upon completion of the various curriculums for presentation of work performed by the students.

Classroom 10 also includes facilitator seating area 34. Facilitator seating area 34 is advantageously located adjacent to the center of classroom 10 so that the facilitator is readily accessible by each of the groups of students.

Computer system 36 is provided as a means for delivering the instruction in the course of study. Computer system 36 broadly includes computers 38 positioned at each of harbors 24, and network computer 40 including conventional memory. Computers 38 are connected to network computer 40 via ethernet.

Each of computers 38 include a display device, an alphanumeric keyboard and a central processing unit (CPU). Computers 38 are configured to access a means for generating and transmitting electronic signals. For example, computers 38 are networked with each other as well as with the network computer 40. Computers 38 may thus be used to generate and transmit electronic signals, such as e-mail messages, to each other. Computers 38 may also be used to store the work of the students in the memory of network computer 40.

Network computer 40 is controlled by the facilitator and is programmed to deliver a portion of each the instructional curriculum to each harbor 24. In a preferred form, these programs are stored on a hard drive of network computer 40. Of course, any other suitable means may alternatively be used.

The curriculum portions cooperably define the instructional curriculums of each suite 12, 14, 16, 18. As a result, computer system 36 provides a means for delivering instruction relating to the instructional curriculum of each suite 12, 14, 16, 18 to harbors 24 of the respective suite.

The instructional curriculums each relate to the course of study and include three curriculum portions. As stated above, each suite 12, 14, 16, 18 is assigned a different instructional curriculum. For example, first suite 12 includes an instructional curriculum marketed under the trademark "TECHNOLOGY IN . . . COMMUNICATIONS". This curriculum includes curriculum portions directed toward digital audio, digital video and digital imaging. This curriculum is configured to teach students how to use modern day tools used in communication.

Second suite 14 utilizes the instructional curriculum marketed under trademark "TECHNOLOGY IN . . . FREE ENTERPRISE". The second curriculum includes the curriculum portions entitled "Entrepreneurship", "Operations" and "Marketing". This curriculum is configured to teach students business acumen.

Third suite 16 presents the instructional curriculum marketed under the trademark "TECHNOLOGY IN . . . DIGITAL MANUFACTURING". This curriculum includes curriculum portions directed toward design, fabrication and materials. This curriculum is configured to assist students in learning about manufacturing industries.

Fourth suite 18 is assigned the instructional curriculum marketed under the trademark "TECHNOLOGY IN . . . COMMUNITY". This curriculum includes the curriculum portions entitled "Education", "Industry" and "City Hall". This curriculum assists students in learning about the functions of government and the role that the student plays in the community.

At the beginning of the course of study, the pool of students is broken into groups of six students. Students who do not comprise a group are assigned to student overflow seating areas 30 or smaller groups of from three to five students configured for assignment to a suite. The groups of students are then each assigned to one of suites 12, 14, 16, 18. A pair of group captains is selected from the students of each group. The group captains are from one particular harbor so that each student in the suite is a captain during one of the three rotations. The captains serve to facilitate and manage group activities. The harbors of the captains are advantageously located closest to the facilitator's workstation. Next, each of the groups is broken into three pairs of students, each pair being assigned to one of harbors 24 within the respective suite.

Each of the curriculums is configured to be taught during three twelve segment periods. In a preferred form, each segment includes about fifty minutes. The first four segments of these periods are used to deliver basic instruction relating to the curriculums in the form of the curriculum portions that are presented to the pairs of students at harbors 24. The curriculum portions expose each of the pairs of students to a specific portion of the curriculum. For example, in first suite 12, a first pair of students is exposed to digital audio, a second pair is exposed to digital video and a third pair is exposed to digital imaging. The portions are configured so that the students experience the integration of the content of the portions and academics into technology, and hands-on activities.

Computer system 36 includes interactive software for delivery of the curriculum portions. The portions include performance and process objectives that are presented to the students. The answers and solutions, some of which include technical writing, are stored on the computer system in the form of a student portfolio. Each of the students also completes a test at the end of each segment. The answers to the test are also secured in a database on network computer 40. The facilitator is thus able to gauge the progress of each student by accessing the portfolio and test results.

Network computer 40 also permits secure storage of a daily journal. The journal is used by each of the students to record their attendance and document what that student worked on during any given segment.

During the next two segments, the groups assemble at group tables 22 of their respective suites 12, 14, 16, 18 where they are each presented with a group project. The group projects are based upon information learned during segments one through four. The group projects are also broken into three segments, each pair of students working on a segment. Once the projects have been presented, each group prepares an abstract outlining the efforts each pair of students will make to finish the group project. Once the abstract has been finished, the pairs of students return to their harbors 24.

Segments seven through ten are used by the pairs of students to work on the group project segments at their respective harbors 24. During this period, the pairs of students are able to communicate with each other for coordinating the group effort by using electronic mail to transmit messages between computers 38. Such communication is designed to introduce new forms of communication to the students as well as fostering a group effort in finishing the group project.

In the final two segments of the twelve segment period, the students reassemble at their respective group tables 22 to prepare and finalize a group response to the group project. The response is then presented to the facilitator and/or the class as a whole. The response may be in the form of a brief, an oral presentation, or a combination of a brief and a presentation. In addition, the response may be given to the facilitator live, or video taped and sent electronically to network computer 40 for review by the facilitator.

Upon completion of the first twelve segment period, each student is switched to a different harbor and matched with a different partner while remaining in the same suite for a second twelve segment period. In addition, a new set of group captains is selected for each group. During this second period, the new pairs of students are presented with curriculum portions as before. Since each student has previously worked on a different curriculum portion, the students bring a new perspective to the learning process during the second twelve segment period. The group projects assigned during the second twelve segment period are designed so that the students are able to apply the projects on a more personal basis relative to the first group projects. As a result, the students are better able to understand the application and articulate the solution.

After the second twelve segment period is completed, each student is again switched to a different harbor and with a different partner while remaining in the same suite for a third and final twelve segment period. Again, a new set of group captains is selected for each group. As a result, each of the students in each group serves as a group captain during the forty-five segment schedule.

By the end of the third twelve segment period, each student within a group will have experienced each instructional curriculum portion for the assigned suite. Accordingly, the group projects assigned during the third twelve segment period are relatively more difficult than the prior group projects. The final group projects attempt to draw on the knowledge gained by the students during each of the twelve segment periods, and show the students how the projects impact the world on a societal level.

A forty-five segment schedule is used for allowing completion of the three twelve segment periods. The additional nine segments may be used for purposes of orienting the students with computer system 36, absences, clean-up, self-assessment, etc. After the schedule is completed, the groups of students are rotated to new suites to receive instruction relating to a different instructional curriculum during another forty-five segment schedule. At this pace, the groups of students will rotate through two of suites 12, 14, 16, 18 in a semester. Therefore, a classroom having four suites 12, 14, 16, 18 occupies the pool of students for an entire school year.

As stated above, student overflow seating areas 30 are used for students not included in a group of from three to six students. Students in these overflow areas 30 are subjected to three twelve-segment rotations. During this time the students are rotated in and out of overflow areas 30 as needed to replace absent students.

While in overflow areas 30, the students are able to receive specialized training, such as training in equipment usage, etc. The students in overflow areas 30 are also able to track the progress of the various groups and create newsletters detailing the progress. The overflow areas 30 may also be used to disseminate career information, reference materials, consumables or supplies required by an associated suite, related business information from community businesses operating in an industry sector, challenges/problems transmitted to the suite for solutions and curriculum needs which leads the student through a twelve segment rotation in concert with a teacher/student contract. In addition, these students may be used to pilot test internet and intranet communication techniques.

The performance of the students during the curriculums is determined by an assessment model that emphasizes and measures how well the students have applied the information they have been given. In a preferred assessment model, content knowledge consists of 25% of the grade, application of knowledge and information consists of 50% of the grade and group and collaborative learning consists of 25% of the grade. Of course, other percentages may be used, as well as other factors, in determining the performance of the students.

Content knowledge is measured by different forms of multiple choice testing delivered to computers 38 by network computer 40. The tests are administered to the students during the first four segments of each curriculum. The answers of each student are stored in network computer 40 for retrieval by the facilitator.

Application of knowledge and information is measured by assessing the student portfolios and daily journals. In addition, the facilitator reviews each of the responses to the group projects. The students may store the responses to the group projects in the student portfolios for review by the facilitator.

The final component of the grade for each student consists of a collaborative learning assessment performed by each student along with the facilitator. This assessment includes three basic parts. The first part is a group grade involving an evaluation of the participation within each student group, and is conducted following each twelve segment period. A single grade is assigned to each individual group. A low grade is assigned to groups that rely exclusively on one spokesperson. A high grade is given to those groups in which all students participate and take on a responsibility. The group grade is based equally on marks given by the students and the facilitator.

The second part of the collaborative learning assessment includes a self-evaluation performed by each student along with the facilitator. Focus is placed on objectives such as: (1) the ability to work well and get along with others; (2) the ability to communicate well with others; (3) the responsibleness of the student and ability to make ethical decisions; (4) problem solving; (5) leading a healthy life; and (6) learning how the curriculum is relevant to real-world careers. In determining whether these objectives have been met, each student, along with the facilitator, examines the work product of the student and the student's portfolio. This review is conducted by the facilitator during segments five and six of each twelve segment period while the students are at the respective group tables 22.

The third part of the collaborative learning assessment is configured to measure whether the group objectives are being met. This review is conducted during segment seven and is based on the interaction of the students in each group during segments five and six.

The invention has been described with reference to the illustrated preferred embodiment. It is noted that variations and changes may be made, and alternatives and equivalents employed without departing from the scope of the invention as set forth in the claims. For example, various other classroom settings may be used in implementing the inventive instructional method. In addition, varying sizes of pools of students may also be used when implementing the method.

What is claimed is:

1. A computer-assisted method of instructing a group of students, the method comprising the steps of:

(a) assigning pairs of students to harbors of a suite, said pairs of students being selected from a group, said suite configured to accommodate said group of students, each of said harbors being configured to accommodate one of said pairs of students, said suite including a group assembly area adjacent to said harbors and an instruction delivery means for delivering instruction relating to an instructional curriculum to said harbors, said curriculum being composed of a plurality of different curriculum portions, said delivery means including a computer system having a plurality of computers and a network computer, one of said plurality of computers being positioned at each of said harbors, said computers being coupled with said network computer;

(b) presenting one of said curriculum portions of said instructional curriculum to each of said pairs of students at each harbor via the instruction delivery means, the pairs of students working on said portions for a selected period of time;

(c) assembling said students within said suite at said group assembly area after said selected period of time;

(d) presenting a group project to the assembled group of students, said project being related to said instructional curriculum, said project including a plurality of different project segments, each of said segments being related to one of said curriculum portions;

(e) assigning each of said pairs of students one of said segments of said group project, said pairs of students working on said segments at their respective harbors using said computer system and the knowledge imparted from the respective curriculum portions; and (f) combining the work of said pairs of students on said project segments using said computer system for completion of said group project by said group, said segments, when combined, cooperating to present a completed project by said group.

2. The method as set forth in claim 1, further including the step of preparation by said group of students of an abstract outlining the efforts said pairs of students will make to finish said group project.

3. The method as set forth in claim 1, further including the steps of reassembling said group of students within said suite at said group assembly area after said pairs of students have worked on the project segments for a second period of time for the step of using said computer system to combine the work of said pairs of students on said projects segments and for presenting the completed project.

4. The method as set forth in claim 3, further including the steps of matching said students with different partners from said group to form a new set of pairs of students after completion of said group project by the group, and assigning said pairs of students to harbors so that each student is assigned to a new harbor.

5. The method as set forth in claim 1, wherein said suite includes three harbors so that said suite is configured to accommodate a group of between about three to six students, and said instructional curriculum includes three different curriculum portions.

6. The method as set forth in claim 1, wherein said selected period of time is four segments, each segment including approximately fifty minutes of work on said curriculum portions by the pairs of students, and said students remain assembled as a group for a two segment period following said selected period of time.

7. The method as set forth in claim 6, wherein said pairs of students work on said project segments for four segments, each segment including approximately fifty minutes of work on said project segments by said pairs of students.

8. The method as set forth in claim 1, further including the step of preparation by each student of a daily journal detailing the work performed by each student during each segment of work on said curriculum portions and project segments.

9. The method as set forth in claim 8, further including the step of evaluating the performance of each student based on the work completed by said students during said selected period of time, said daily journal and said group project.

10. A computer-assisted method of instructing a group of students, the method comprising the steps of:

(a) assigning pairs of students to harbors of a suite, said pairs of students being selected from a group, said suite configured to accommodate said group of students, each of said harbors being configured to accommodate one of said pairs of students, said suite including a group assembly area adjacent to said harbors and an instruction delivery means for delivering instruction relating to an instructional curriculum to said harbors, said instructional curriculum including a plurality of different curriculum portions, said delivery means including a computer system having a plurality of computers and a network computer, one of said computers being positioned at each of said harbors, said computers being coupled with said network computer, said computer system further including means for generating and transmitting electronic signals between said computers;

(b) presenting one of said curriculum portions of said instructional curriculum to each of said pairs of students at each harbor via the instruction delivery means, the pairs of students working on said portions for a selected period of time;

(c) presenting a group project to the students after the selected period of time, the project being related to the instructional curriculum, the project including a plurality of different project segments, each of said project segments being related to one of said curriculum portions;

(d) assigning each of said pairs of students one of said segments of said group project, said pairs of students working on said segments using said computer system and the knowledge imparted from the respective curriculum portions, said pairs of students communicating with each other while working on said project segments by using said computer system for transmitting electronic signals between said computers; and (f) using said computer system to combine the work of said pairs of students on said project segments for completion of said group project by said group, said segments, when combined, cooperating to present a completed project by said group.

11. The method as set forth in claim 10, further including the step of preparation by said group of students of an abstract outlining the efforts that said pairs of students will make to finish said group project.

12. The method as set forth in claim 10, further including the step of assembling said group of students within said suite at said group assembly area prior to the step of presenting said group project to said students, said students leaving said group assembly area after the presentation step to work on said project segments of said group project at their respective harbors.

13. The method as set forth in claim 10, further including the steps of matching said students with different partners from said group to form a new set of pairs of students after completion of said group project by said group, and assigning the new pairs of students to harbors so that each student is assigned to a new harbor.

14. The method as set forth in claim 10, wherein said suite includes three harbors so that said suite is configured to accommodate a group of between about three to six students and said instructional curriculum includes three curriculum portions.

15. The method as set forth in claim 10, wherein said selected period of time is four segments, each segment including approximately fifty minutes of work on said curriculum portions by said pairs of students, and said students remain assembled as a group for a two segment period following said selected period of time.

16. The method as set forth in claim 15, wherein said pairs of students work on said project segments for four segments, each segment including approximately fifty minutes of work on said project segments by said pairs of students.

17. The method as set forth in claim 10, further including the step of preparation by each student of a daily journal detailing the work performed by each student during each segment of work on said curriculum portions and project segments.

18. The method as set forth in claim 17, further including the step of evaluating the performance of said group based on the work completed by said students during said selected period of time, said daily journal and said group project.

19. The method as set forth in claim 10, further including the step of monitoring electronic signals transmitted between said computers from a remote location with respect to said suite.

20. A computer-assisted method of instructing a pool of students, the method comprising the steps of:

(a) assigning pairs of students to harbors of suites provided in a classroom, said pairs of students being selected from a pool of students, each of said harbors being configured to accommodate one of said pairs of students, each of said suites being configured to accommodate a group of said pairs of students, said suite including a plurality of said harbors and a group assembly area adjacent to said harbors, said classroom including and an instruction delivery means for delivering instruction relating to a course of study to said harbors, said course of study including a plurality of different instructional curriculums, each of said curriculums including a plurality of different curriculum portions, said delivery means including a computer system having a plurality of computers coupled with a network computer, one of said computers being positioned at each of said harbors;

(b) presenting one of said curriculum portions to each of said pairs of students of each of said suites via the instruction delivery means so that each suite is presented with a different one of said instructional curriculums, the pairs of students working on said portions for a selected period of time;

(c) assembling each group of said pairs of students within each of said suites at said group assembly areas after said selected period of time;

(d) presenting a group project to each of the assembled groups of students, each of said projects being related to each of said instructional curriculums of each suite, each group project including a plurality of different project segments, each of said project segments being related to one of said curriculum portions;

(e) assigning each of said pairs of students one of said segments of their respective group projects, said pairs of students working on said segments at their respective harbors using said computer system and the knowledge imparted from the respective curriculum portions; and (f) combining the work of each group of students on said project segments using said computer system for completion of said group projects by each of said groups, said segments, when combined within each group, cooperating to present a completed project for each of said groups.

21. The method as set forth in claim 20, further including the step of preparation by each group of students of an abstract outlining the efforts that said pairs of each group of students will make to finish said respective group projects.

22. The method as set forth in claim 20, further including the steps of reassembling said groups of students within said respective suites at said group assembly areas after said pairs of students have worked on said project segments for a second period of time, and preparation by each group of students of a group response to said respective group projects.

23. The method as set forth in claim 20, further including the steps of matching said students of each group with different partners from said respective groups to form a new set of pairs of each group of students after completion of said group projects by said groups, and assigning said pairs of students to harbors so that each student is assigned to a new harbor.

24. The method as set forth in claim 20, wherein each of said suites includes three harbors so that each of said suites is configured to accommodate a group of between about three to six students and each of said instructional curriculums includes three different curriculum portions.

25. The method as set forth in claim 20, wherein said selected period of time is four segments, each segment including approximately fifty minutes of work on said curriculum portions by said pairs of students, and said students remain assembled in their respective groups for a two segment period following said selected period of time.

26. The method as set forth in claim 25, wherein said pairs of students work on said project segments for four segments, each segment including approximately fifty minutes of work on said project segments by said pairs of students.

27. The method as set forth in claim 20, further including the step of preparation by each student of a daily journal detailing the work performed by each student during each segment of work on said curriculum portions and project segments.

28. The method as set forth in claim 27, further including the step of evaluating the performance of each of said groups based on the work completed by said students, said daily journal and said group project.

29. The method as set forth in claim 20, said computer system further including means for generating and transmitting electronic signals between said computers, the method further including the step of said pairs of students within each group using said computer system to communicate with each other while working on said project segments by transmitting electronic signals between said computers.

\* \* \* \* \*